United States Patent [19]

Kintz

[11] Patent Number: 5,542,733

[45] Date of Patent: Aug. 6, 1996

[54] TRUCK TARP ASSEMBLY

[76] Inventor: Damon B. Kintz, R.R. 3, Lime Spring, Iowa

[21] Appl. No.: 324,925

[22] Filed: Oct. 18, 1994

[51] Int. Cl.$^6$ .................................................... B60P 7/04
[52] U.S. Cl. ............................ 296/98; 160/26; 296/100
[58] Field of Search ............................... 296/98, 100, 36, 296/32, 34, 101, 37.6, 161, 163; 160/23.1, 26

[56] References Cited

U.S. PATENT DOCUMENTS

| | | | |
|---|---|---|---|
| Re. 31,746 | 11/1984 | Dimmer et al. | 296/98 |
| 1,937,197 | 11/1933 | Halladay | 293/102 |
| 4,302,043 | 11/1981 | Dimmer et al. | 296/98 |
| 4,479,677 | 10/1984 | Gulette et al. | 160/23.1 X |
| 4,484,777 | 11/1984 | Michel | 296/98 |
| 4,505,512 | 3/1985 | Schmeichel et al. | 296/98 |
| 4,611,848 | 9/1986 | Romano | 296/98 |
| 4,657,062 | 4/1987 | Tuerk | 160/243 |
| 4,720,135 | 1/1988 | Farina | 296/161 X |
| 4,838,602 | 6/1989 | Nett | 296/100 |
| 4,848,823 | 7/1989 | Flohr et al. | 296/98 |
| 4,971,384 | 11/1990 | Baldwin | 296/98 |
| 5,022,700 | 6/1991 | Fasiska et al. | 296/98 X |
| 5,056,839 | 10/1991 | Yoon | 293/117 |
| 5,056,855 | 10/1991 | Moravsky | 296/98 |
| 5,096,250 | 3/1992 | Menz | 296/98 |
| 5,129,698 | 7/1992 | Cohrs et al. | 296/98 |
| 5,174,625 | 12/1992 | Gothier et al. | 296/98 |
| 5,211,441 | 5/1993 | Barkus et al. | 296/98 X |

FOREIGN PATENT DOCUMENTS 2675090  10/1992  France ........................... 296/100

*Primary Examiner*—David M. Mitchell
*Assistant Examiner*—Kia M. Robinson
*Attorney, Agent, or Firm*—Zarley, McKee, Thomte, Voorhees & Sease

[57] ABSTRACT

A tarp assembly is provided for a pick-up truck, and includes a pair of elongated rails mounted to the side walls of the truck along the truck bed. The first rail includes a rotatable shaft with a crank assembly controlling the rotation of the shaft. A tarp is movable between a storage position within the first rail and a use position extending over the rails and over cargo contained in the bed of the truck. A hook on the free side of the tarp secures the tarp to the second rail in the use position.

23 Claims, 2 Drawing Sheets

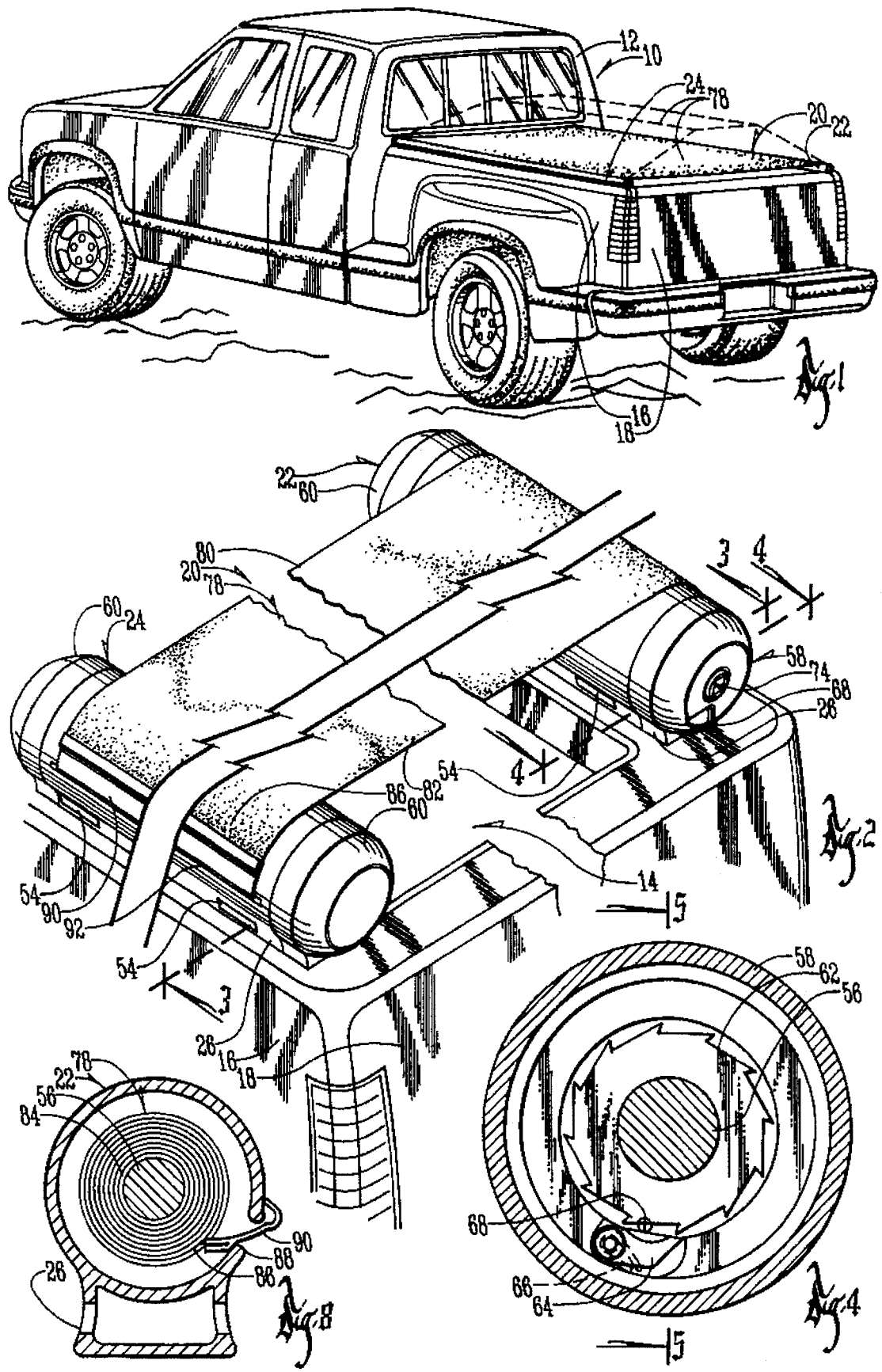

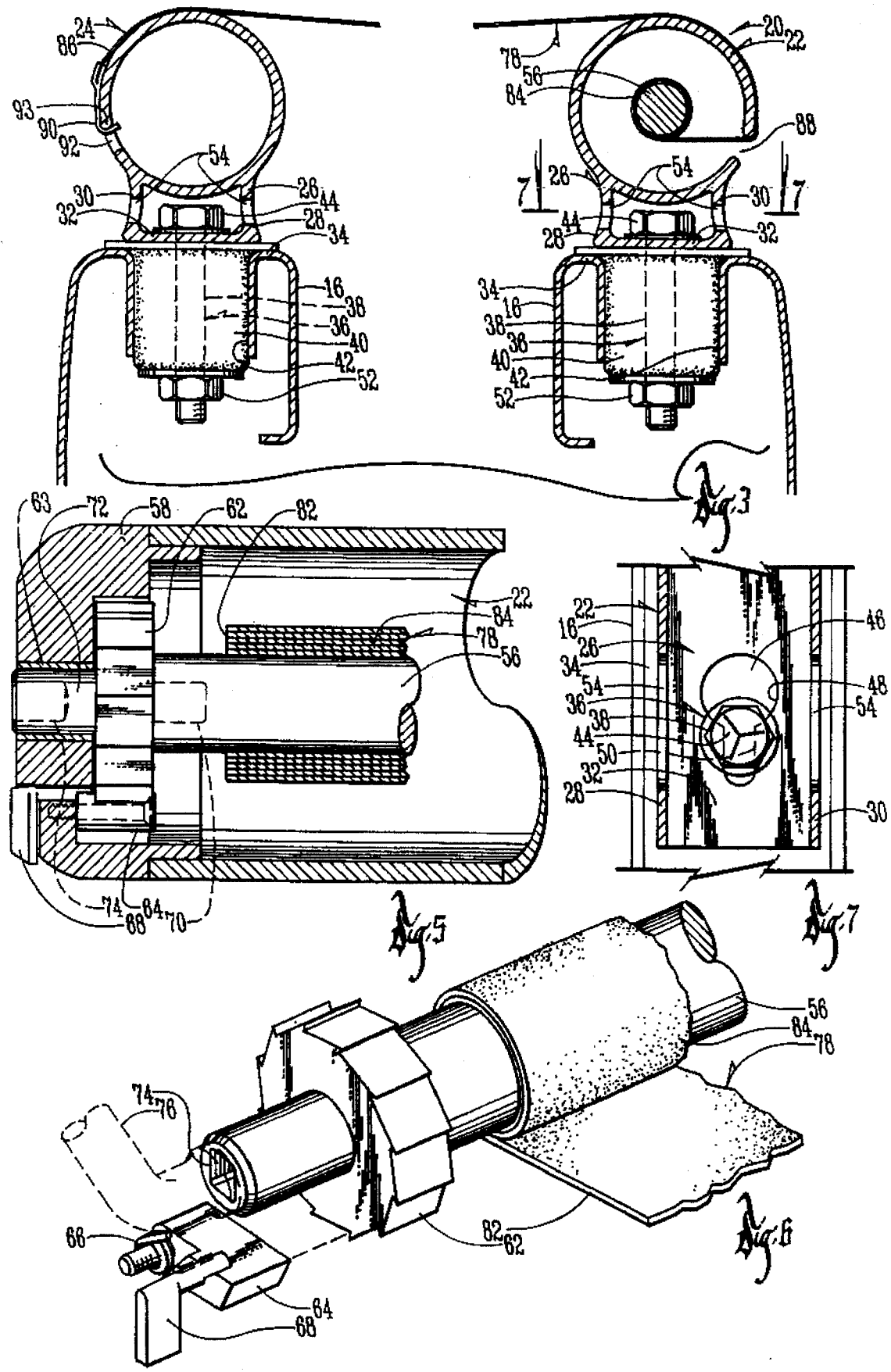

TRUCK TARP ASSEMBLY

BACKGROUND OF THE INVENTION

Covers and enclosures for pick-up truck beds are well known for enclosing and retaining cargo in the bed of the truck. Topper units are rigid and extend upwardly from the sides of the bed to a height approximately even with the top of the truck cab. However, topper units require cargo to be loaded from the rear of the bed through a door, rather than over the side of the bed. Toppers also limit the size of cargo to that which can fit through the rear door opening. Other prior art bed covers slideably, rollably, or snap into position over the truck bed at an elevation substantially level with the side walls of the bed. These prior art covers limit the height of the cargo to a level no higher than the side of the bed if the cover is to be used, and do not accommodate taller or bulkier cargo which extends above the bed side walls. Also, for covers such as snap-on tarps, which are removable from the truck bed, the tarps must be stowed when not in use.

Accordingly, a primary objective of the present invention is an improved pick-up truck tarp assembly.

Another objective of the present invention is the provision of a truck tarp assembly wherein the tarp is movable between a storage position on the truck and an extended use position covering the bed of the truck.

A further objective of the present invention is a truck tarp assembly wherein the tarp will cover objects extending above the side walls of the truck bed.

Another objective of the present invention is the provision of a tarp assembly for pick-up trucks which is economical to manufacture, and durable and safe in use.

A further objective of the present invention is the provision of an improved tarp assembly for pickup trucks which is both functional and aesthetically acceptable in appearance.

These and other objectives will become apparent from the following description of the invention.

SUMMARY OF THE INVENTION

The improved tarp assembly of the present invention is primarily for use on pick-up trucks having a bed with opposite side walls. A first elongated hollow tube or rail is mounted on one of the bed side walls, and a second tube or rail is mounted on the opposite side wall. An elongated shaft is rotatably mounted within the first rail. A tarp has a first side secured or attached to the shaft, with a second free side extending through an elongated slot in the first rail. The tarp can be unrolled from the shaft so as to extend over the bed, with the second end of the tarp being attached to the second rail. In this use position, the tarp can extend above the plane defined by the upper surface of the rails, so as to cover and enclose cargo within the bed which extends above such plane. When not in use, the tarp can be retracted and rolled into a storage position onto the shaft within the first rail. This storage position protects the tarp from the weather and elements so as to preserve and extend the life of the tarp. A pawl and ratchet assembly with a crank are operatively connected to the shaft on the rearward end of the first rail so as to facilitate the rolling and unrolling of the tarp with respect to the first rail. The rails are mounted on the side walls of the truck by the use of a plurality of expandable nut and bolt assemblies extending through the stake pockets of the truck side walls. Apertures are provided in the rails to provide access for a wrench to the heads of the bolts.

BRIEF DESCRIPTION OF THE DRAWINGS

FIG. 1 is a perspective view of a pick-up truck having the tarp assembly of the present invention.

FIG. 2 is an enlarged perspective view of the tarp assembly.

FIG. 3 is a sectional view of the tarp assembly taken along lines 3—3 of FIG. 2 and showing the tarp in a use position.

FIG. 4 is a sectional view of the first rail of the tarp assembly taken along lines 4—4 of FIG. 2.

FIG. 5 is a sectional view taken along lines 5—5 of FIG. 4.

FIG. 6 is a perspective view of the internal components of the first rail.

FIG. 7 is a sectional view taken along lines 7—7 of FIG. 3.

FIG. 8 is a sectional view showing the tarp in a storage position.

DETAILED DESCRIPTION OF THE DRAWINGS

With reference to the drawings, a pick-up truck is generally designated by the reference numeral 10. The truck 10 includes a cab 12 and a bed 14 defined by the rear of the cab, the side walls 16 of the truck, and the tail gate 18. As best seen in FIG. 3, each of the side walls 16 include a plurality of conventional stake pockets. The truck 10, as described above, is conventional and does not constitute a part of the present invention.

The tarp assembly of the present invention is generally designated in the drawings by the reference numeral 20. The tarp assembly 20 includes a first rail 22 mounted on the top of one of the side walls 16 of the truck, and a second rail 24 mounted on the top of the other side wall of the truck. While the rails 22, 24 are shown in the drawings to be circular in cross section, they may take other shapes, such as square, for ornamental and aesthetic purposes. Each rail 22, 24 includes base portions 26 for mounting the rail to the respective truck side wall 16. Each base portion 26 includes inner and outer side walls 28, 30, respectively and an inner connecting bottom wall 32 extending between the side walls 28, 30. The bottom wall 32 is substantially flat so as to sit upon the upper wall 34 of the side wall 16.

A plurality of expandable nut and bolt assemblies 36 are used to secure the rails 22, 24 to the side walls 16. More particularly, as best seen in FIG. 3, associated with each base portion 26 is a bolt 38 with an expandable collar 40 extending upwardly through the stake pocket 42 of the truck side wall 16. The head 44 of the bolt extends through an enlarged portion 46 of a keyed slot 48 in the bottom wall 32 of the base portion 26 of the respective rail 22, 24. The bolt is then slid into a narrowed portion 50 of the slot 48 such that the head 44 of the bolt 38 is retained within the base portion 26. A nut 52 is tightened upon the bolt 38, thereby expanding the collar 40 so as to secure the rails 22, 24 to the truck side wall 16. An aperture 54 is provided in each of the side walls 28, 30 of the base portion 26 so as to allow a wrench to be placed upon the head 44 of the bolt 38, while the nut 52 is tightened from below the stake pocket 42.

The first rail 22 is hollow and rotatably supports an axle or shaft 56 for rotation about its longitudinal axis. The rail 22 is closed at its opposite ends by end caps 58 and 60, which are secured to the rail in any convenient manner, such as set screws (not shown). The rail 24 has opposite end caps which are identical to end cap 60. A ratchet 62 is rotatably mounted within a bushing 63 on the end cap 58. A pawl is operatively mounted within the end cap 58 for selective engagement with the teeth of the ratchet 62. The pawl 64 is normally biased by a spring 66 into retentive engagement with one of the teeth of the ratchet 62. An actuation lever 68 is attached to the pawl 64 and extends through the end cap 58 so that a person can disengage the pawl 64 from engagement with the ratchet 62. The ratchet 62 has a stub 70 secured to the corresponding end of the shaft 56, as best seen in FIG. 5. A second stub 72 extends into the end cap 58 and terminates adjacent the outer surface of the end cap. The stub 72 has an aperture 74 for receiving a crank 76 for rotating the ratchet 62, and thus the shaft 56 in either a clockwise or counterclockwise direction. Thus, the ratchet 62, the pawl 64, and the crank 76 form a crank assembly for controlling the rotation of the shaft 56.

The tarp assembly 20 includes a tarp 78 having a front edge 80, a rear edge 82, a first side 84 and a second side 86. The first side 84 of the tarp 78 is attached or secured to the shaft 56 in any convenient manner. The tarp 78 extends outwardly through an elongated slot 88 in the first rail 22, as best seen in FIG. 3. The second side 86 of the tarp 78 is free and includes a hook 90 adapted to be received within an elongated slot 92 in the second rail 24. While the hook 90 is shown to be an elongated member, it is understood that the hook can be formed from a plurality of individual hook elements. The slot 92 defines a lip which retentively engages the hook.

The tarp 78 is movable between a storage position inside the first rail 22, as seen in FIG. 8, and a use or covering position, as seen in FIGS. 1, 2 and 3, wherein the tarp extends between the rails 22, 24 and over the bed 14. In the storage position, the tarp is retracted into the rail 22 and rolled upon the shaft 56 so that only the hook 90 resides outside of the first rail 22. In the storage position, the tarp 78 is hidden from view and protected from the weather and the elements by the first rail 22. Also, with the tarp in the storage position, the rails may serve as tie down structures so as to secure cargo in the bed of the truck with ropes or the like. The rails also provide a decorative ornamental feature on the back of the truck 10.

To move the tarp from the storage position to the use position, the pawl 64 is disengaged from the ratchet 62 by pivoting the actuation lever 68 counterclockwise, as shown in FIG. 6. The disengagement of the pawl from the ratchet allows a person to pull the tarp through the slot 88 in the first rail 22 as the shaft 56 rotates counterclockwise (as viewed from the rear). The tarp is extended over the top of the rail 22, over any cargo in the bed 14, over the top of the second rail 24, and secured in place by the hook 90 in the slot 92 of the second rail 24. The pawl 64 is then engaged with the ratchet 62 by turning the actuation lever 68 in a clockwise direction, thereby locking the shaft 56 against further counter clockwise rotation. The crank 76 can be placed in the aperture 74 of the stub 72 and turned in a clockwise direction so as to tighten the tarp 78 between the rails 22, 24. Thus, if the cargo in the bed 14 resides below the side walls 16 of the truck 10, the tarp will be substantially horizontally disposed when tightened, as shown in FIGS. 2 and 3. Alternatively, if the cargo extends above the side wall 16 of the truck, the tarp 78 will extend over the cargo, as shown in dotted lines in FIG. 1. The tarp 78 is sufficiently wide so that it can extend to cover cargo at an elevation substantially level with the top of the cab 12 of the truck 10.

The tarp 78 is moved from the use position to the storage position by disengaging the hook 90 from the slot 92, and turning the crank 76 in a clockwise direction to roll up the tarp on the shaft 56. The pawl 64 preferably engages the ratchet during this tarp retraction process.

Whereas the invention has been shown and described in connection with the preferred embodiments thereof, it will be understood that many modifications, substitutions, and additions may be made which are within the intended broad scope of the following claims. For example, the tarp assembly of the present invention can be used on any open body bed, such as grain trucks, or between two frames on opposite sides of an object to be covered. Also, a motor may be provided for retracting the tarp to the storage position.

From the foregoing, it can be seen that the present invention accomplishes at least all of the stated objectives.

What is claimed is:

1. A tarp device for a truck having a bed with opposite first and second side walls and a bottom wall for holding cargo, the device comprising:

a first hollow tubular rail rigidly mounted on the first side wall of the truck bed, with an elongated slot extending along the rail;

a second rail mounted on the second side wall of the truck bed;

a shaft rotatably mounted within the first rail;

a tarp having opposite first and second sides, the tarp extending through the slot in the first rail and having the first side secured to the shaft and the second side releasably securable to the second rail;

the shaft being rotatable in a first direction to roll the tarp onto the shaft for enclosed-storage within the first rail, and the shaft being rotatable in an opposite second direction to unroll the tarp from the shaft such that the tarp is extensible over the bed to cover cargo in the truck bed with the second side of the tarp being securable to the second rail; and the second side of the tarp having a rigid hook for rententively engaging a lip on the second rail.

2. The tarp device of claim 1 further comprising a pawl and ratchet assembly in the first rail for controlling the rotation of the shaft.

3. The truck device of claim 1 wherein each rail includes a mounting portion for securing the rail to the side wall of the truck.

4. The truck device of claim 3 wherein the side walls of the truck each have a plurality of stake pockets, and the mounting portions of the rails are secured to the side walls of the truck using expandable nut and bolt assemblies extending through the stake pockets.

5. The truck device of claim 1 wherein the tarp is sufficiently wide to extend substantially upwardly above a plane defined by a top portion of the rails, so as to cover cargo extending substantially above said plane.

6. The tarp device of claim 1 wherein each rail has a longitudinal axis, the first rail having a lower periphery exterior portion, and the slot extending axially in the lower periphery exterior portion such that the tarp extends over the first rail when secured to the second rail.

7. The tarp device of claim 1 wherein the lip is on a lower periphery exterior portion of the second rail, such that the tarp extends over the second rail when secured thereto.

8. The tarp device of claim 1 wherein the lip is formed by a slot extending axially in the second rail.

9. The tarp device of claim 1 wherein each rail comprises a substantially cylindrical tube integrally connected to a base portion, with the base portion adapted to be rigidly mounted on one of the side walls of the bed of the truck.

10. A tarp device for a truck having a bed with opposite first and second side walls and a bottom wall for holding cargo, the device comprising:

a first hollow tubular rail rigidly mounted on the first side wall of the truck bed, with an elongated slot extending along the rail;

a second rail mounted on the second side wall of the truck bed;

a shaft rotatably mounted within the first rail;

a tarp having opposite first and second sides, the tarp extending through the slot in the first rail and having the first side secured to the shaft and the second side releasably securable to the second rail;

the shaft being rotatable in a first direction to roll the tarp onto the shaft for enclosed storage within the first rail, and the shaft being rotatable in an opposite second direction to unroll the tarp from the shaft such that the tarp is extensible over the bed to cover cargo in the truck bed with the second side of the tarp being securable to the second rail;

each rail including a mounting portion for securing the rail to the side wall of the truck; and the side walls of the truck each having a plurality of stake pockets, and the mounting portions of the rails being secured to the side walls of the truck using expandable nut and bolt assemblies extending through the stake pockets.

11. The tarp device of claim 10 wherein the second side of the tarp has a rigid hook for retentively engaging a lip on the second rail.

12. The truck device of claim 10 wherein each mounting portion includes a keyed slot for slidably receiving a bolt with a head.

13. The truck device of claim 12 wherein the mounting portions have an aperture therein for receiving a wrench to hold the head of the bolt against rotation.

14. A tarp device for a truck having a bed with opposite first and second side walls and a bottom wall for holding cargo, the device comprising:

a first hollow tubular rail rigidly mounted on the first side wall of the truck bed, with an elongated slot extending along the rail;

a second rail mounted on the second side wall of the truck bed;

a shaft rotatably mounted within the first rail;

a tarp having opposite first and second sides, the tarp extending through the slot in the first rail and having the first side secured to the shaft and the second side releasably securable to the second rail;

the shaft being rotatable in a first direction to roll the tarp onto the shaft for enclosed storage within the first rail, and the shaft being rotatable in an opposite second direction to unroll the tarp from the shaft such that the tarp is extensible over the bed to cover cargo in the truck bed with the second side of the tarp being securable to the second rail; and each rail having a longitudinal axis, the first rail having a lower exterior periphery exterior portion, and the slot extending axially in the lower periphery exterior portion such that the tarp extends over the first rail when secured to the second rail.

15. The tarp device of claim 14 wherein the second side of the tarp has a rigid hook for retentively engaging a lip on the second rail.

16. A tarp device for a truck having a bed with opposite first and second side walls and a bottom wall for holding cargo, the device comprising:

a first hollow tubular rail rigidly mounted on the first side wall of the truck bed, with an elongated slot extending along the rail;

a second rail mounted on the second side wall of the truck bed;

a shaft rotatably mounted within the first rail;

a tarp having opposite first and second sides, the tarp extending through the slot in the first rail and having the first side secured to the shaft and the second side releasably securable to the second rail;

the shaft being rotatable in a first direction to roll the tarp onto the shaft for enclosed storage within the first rail, and the shaft being rotatable in an opposite second direction to unroll the tarp from the shaft such that the tarp is extensible over the bed to cover cargo in the truck bed with the second side of the tarp being securable to the second rail; and each rail comprising a substantially cylindrical tube integrally connected to a base portion, with the base portion adapted to be rigidly mounted on one of the side walls of the bed of the truck.

17. The tarp device of claim 16 wherein the base portion is a U-shaped member having opposite upstanding legs supporting the cylindrical tube and a web extending between the legs.

18. The tarp device of claim 16 wherein the tube and the base portion are a one piece extruded element.

19. The tarp device of claim 16 wherein the second side of the tarp has a rigid hook for retentively engaging a lip on the second rail.

20. A tarp assembly for a pick-up truck having a bed, comprising:

a pair of elongated rails rigidly mounted on each side of the bed;

a tarp movable between a storage position substantially enclosed within one of the rails and a use position extending from one of the rails to the other of the rails over the bed of the truck;

the one rail including a shaft rotatably mounted therein about which the tarp rolls for the storage position and unrolls for the use position;

wherein the tarp having a first side attached to the shaft and a second side selectively securable to the other rail, the one rail having a slot through which the tarp extends; and each rail having a longitudinal axis, the one rail having a lower exterior periphery portion, and the slot extending axially in the lower exterior periphery portion such that the tarp extends over the one rail when moved to the use position.

21. The tarp assembly of claim 20 further comprising a releasable lock mechanism for controlling the rotation of the shaft.

22. The tarp assembly of claim 21 wherein the lock mechanism includes a pawl and ratchet.

23. The tarp assembly device of claim 20 wherein one side of the tarp has a rigid hook for retentively engaging the other of the rails.

* * * * *